(12) United States Patent
Abe

(10) Patent No.: US 10,889,234 B2
(45) Date of Patent: Jan. 12, 2021

(54) VEHICLE LAMP

(71) Applicant: Ichikoh Industries, Ltd., Isehara (JP)

(72) Inventor: Toshiya Abe, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 16/477,924

(22) PCT Filed: Jan. 19, 2018

(86) PCT No.: PCT/JP2018/001560
§ 371 (c)(1),
(2) Date: Jul. 15, 2019

(87) PCT Pub. No.: WO2018/135615
PCT Pub. Date: Jul. 26, 2018

(65) Prior Publication Data
US 2019/0366910 A1 Dec. 5, 2019

(30) Foreign Application Priority Data

Jan. 20, 2017 (JP) .................................. 2017-008393
Jan. 20, 2017 (JP) .................................. 2017-008394

(51) Int. Cl.
*B60Q 1/14* (2006.01)
*F21S 41/689* (2018.01)
(Continued)

(52) U.S. Cl.
CPC .......... *B60Q 1/1438* (2013.01); *F21S 41/689* (2018.01); *F21V 11/183* (2013.01); *F21V 14/08* (2013.01)

(58) Field of Classification Search
CPC ...... B60Q 1/1438; F21S 41/00; F21S 41/689; F21S 43/00; F21S 45/00; F21V 11/183; F21V 14/08
See application file for complete search history.

(56) References Cited

U.S. PATENT DOCUMENTS

2006/0164852 A1* 7/2006 Mochizuki ............ F21S 41/689
362/539
2008/0310180 A1* 12/2008 Shoji .................... B60Q 1/0683
362/507
(Continued)

FOREIGN PATENT DOCUMENTS

JP  2008-311129 A  12/2008
JP  2011-258485 A  12/2011
(Continued)

OTHER PUBLICATIONS

English Machine Translation of JP 2017010689 (Year: 2017).*
International Search Report dated Apr. 3, 2018 in PCT/JP2018/001560 filed on Jan. 19, 2018.

*Primary Examiner* — Zheng Song
(74) *Attorney, Agent, or Firm* — Oblon, McClelland, Maier & Neustadt, L.L.P.

(57) ABSTRACT

The vehicle lamp according to the present invention includes: a light source; a movable shade rotating in a front-back direction and switchable to a second position where some of light from the light source is blocked; a power section having a moving shaft moving in a horizontal direction; and a power-transmitting section transmitting a moving force of the moving shaft, as a rotary force of the movable shade. The moving shaft has an engagement groove with which the power-transmitting section is engaged. The power-transmitting section includes a second arm having an engagement section slidably engaged with the engagement groove. The engagement section includes a first engagement section engaged with the engagement groove and extending in the front-back direction, and a second engagement section that has a substantially linear shape, is engaged with the engagement groove and is connected to and bent with respect to the first engagement section.

11 Claims, 13 Drawing Sheets

(51) Int. Cl.
*F21V 11/18* (2006.01)
*F21V 14/08* (2006.01)

(56) References Cited

U.S. PATENT DOCUMENTS

| | | | |
|---|---|---|---|
| 2011/0170308 A1* | 7/2011 | Kinoshita | F21S 41/321 362/516 |
| 2011/0249463 A1* | 10/2011 | Huang | F21S 41/689 362/526 |
| 2014/0092617 A1* | 4/2014 | Yokoi | F21S 41/698 362/512 |
| 2015/0362146 A1 | 12/2015 | Mochizuki | |
| 2016/0161075 A1* | 6/2016 | Lee | F21S 41/689 362/512 |
| 2018/0066823 A1* | 3/2018 | Chou | F21S 41/32 |
| 2018/0094787 A1* | 4/2018 | Abe | F21S 41/50 |

FOREIGN PATENT DOCUMENTS

| | | |
|---|---|---|
| JP | 2012-59551 A | 3/2012 |
| JP | 2016-152129 A | 8/2016 |
| JP | 2017-10689 A | 1/2017 |
| WO | WO 2014/115875 A1 | 7/2014 |

\* cited by examiner

VEHICLE LAMP

TECHNICAL FIELD

The present invention relates to a vehicle lamp.

BACKGROUND ART

PTL 1 discloses a vehicle headlamp in which a drive mechanism and a movable shade are coupled by a link member (hereinafter also referred to as a power-transmitting section).

The link member is formed in a second coupling section having a Ω shaped tip on the drive mechanism side, and the coupling between the link member and the drive mechanism is carried out by coupling the Ω-shaped second coupling section to an output shaft (hereinafter also referred to as a moving shaft) of the drive mechanism.

In addition, PTL 2 discloses a vehicle lamp in which a movable shade and a drive plunger of an electromagnetic solenoid are coupled by a coupling rod, and light distribution is switched by rotating the movable shade in a front-back direction.

CITATION LIST

Patent Literature

PTL 1: Japanese Unexamined Patent Application Publication No. 2012-59551
PTL 2: Japanese Unexamined Patent Application Publication No. 2011-258485

SUMMARY OF THE INVENTION

Problems to be Solved by the Invention

However, as in PTL 1, in the case of the Ω-shaped second coupling section, there is a problem that, while the second coupling section is unlikely to be disconnected due to a smaller width of an opening portion than a diameter of the moving shaft, it is difficult to carry out work to couple the second coupling section to the moving shaft.

There is also a problem that, in the case where a large driving force is generated to cause the rotation of the movable shade, a driving source of the electromagnetic solenoid and the like has to produce large output.

The present invention has been made in view of such circumstances, and therefore an object of the present invention is to provide a vehicle lamp in which a power-transmitting section can easily be engaged with a moving shaft and the power-transmitting section is unlikely to be disengaged from the moving shaft. Another object of the present invention is to provide a vehicle lamp in which a force exerted for rotation of a movable shade is reduced.

Means for Solving the Problem

In order to achieve the above purposes, the present invention is grasped by the following configuration.

(1) A vehicle lamp according to the present invention includes a light source and a movable shade section. The movable shade section includes: a movable shade that rotates in a front-back direction and is switchable between a first position where light from the light source is not blocked and a second position where some of the light is blocked; a power section having a moving shaft that moves in a horizontal direction to cause the rotation of the movable shade; and a power-transmitting section that is interposed between the movable shade and the power section and transmits a moving force of the moving shaft as a rotary force of the movable shade. The moving shaft has, on an outer circumference thereof, an engagement groove with which the power-transmitting section is engaged. The power-transmitting section includes: a bearing section that is provided in an intermediate portion thereof and is supported to be rotatable in the horizontal direction orthogonal to the front-back direction; a first arm that extends from the bearing section toward the movable shade side and is engaged with the movable shade; and a second arm that extends from the bearing section toward the moving shaft side and has an engagement section slidably engaged with the engagement groove. The engagement section includes: a first engagement section that is engaged with the engagement groove and extends in the front-back direction; and a second engagement section that has a substantially linear shape, is engaged with the engagement groove and is connected to and bent with respect to the first engagement section.

(2) In the configuration of above (1), the second engagement section has such a length that the second engagement section is not disengaged from the engagement groove at the time of sliding along the engagement groove in association with the rotation of the power-transmitting section in the front-back direction.

(3) In the configuration of above (1) or (2), in a side view in which the movable shade section is viewed from a side, when a straight line that connects a rotation fulcrum at the time when the power-transmitting section rotates in the front-back direction and a center point of a cross section of the moving shaft is set as a reference line, an angle on the rotation fulcrum side, which is formed by the reference line and a portion of the second engagement section on an opposite side to the first engagement section relative to an intersection point where the second engagement section and the reference line intersect with each other, is set to equal to or larger than 80 degrees and equal to or smaller than 110 degrees.

(4) In the configuration of above (3), the movable shade section includes a bracket provided with the movable shade, the power section, and the power-transmitting section. The bracket includes a support shaft that extends along the front-back direction and rotatably supports the bearing section. When the bearing section supported by the support shaft is viewed in a side view in which the movable shade section is viewed from the side, the rotation fulcrum is located at a substantially center position of the bearing section.

(5) In the configuration of above (4), the movable shade is attached to an upper portion of the bracket via a shaft section that supports the movable shade to be rotatable in the front-back direction. The power section is attached to a front side surface of the bracket. The support shaft extends to the back along the front-back direction from a back side surface of the bracket. The bracket has a lead-out section that leads out the engagement section of the second arm of the power-transmitting section such that the engagement section is positioned on a front side. The lead-out section is formed not to hinder motion of the second arm associated with movement of the moving shaft of the power section.

(6) In the configuration of one of above (1) to (5), the engagement groove has a width that is equal to or larger than 1.1 times and equal to or smaller than 1.5 times a diameter of a cross section of the power-transmitting section.

(7) In the configuration of one of above (1) to (6), the power-transmitting section is formed of a wire, and the bearing section is a portion of the wire that is bent in a loop shape.

(8) A vehicle lamp according to the present invention is a vehicle lamp that includes a light source and a movable shade section. The movable shade section includes a movable shade that rotates in a front-back direction about a rotation center shaft and is switchable between a first position where light from the light source is not blocked and a second position where the movable shade has a lifted posture from the first position and some of the light is blocked. The movable shade includes: a main body section that has an upper end shaped to form a cutoff line; and an auxiliary section that is connected to a lower portion of the main body section in a vertical direction. When the movable shade is positioned at the second position, at least a portion of the auxiliary section that is lower than the rotation center shaft in the vertical direction is bent toward the main body section side so as to be positioned on the main body section side.

(9) In the configuration of above (8), when viewed in a state where the movable shade is positioned at the second position, the auxiliary section includes: a lower portion which is located on a back side of the main body section and at least a part of which is positioned closer to the main body section side than the rotation center shaft; an intermediate portion that is bent from the lower portion and extends through a position above the rotation center shaft in the vertical direction so as to more separate from the main body section than the rotation center shaft; and an upper portion that is bent from the intermediate portion and extends upward in the vertical direction. The upper portion has an upper end shaped to be form a cutoff line.

(10) In the configuration of above (9), the lower portion is in substantially tight contact with the main body section.

(11) In the configuration of above (9) or (10), a portion of the upper end of the upper portion where the cutoff line is formed is set to have a thickness smaller than a thickness of a portion of the upper portion on the intermediate portion side.

(12) In the configuration of any one of above (8) to (11), the movable shade section includes a bracket to which the movable shade is attached. The movable shade is attached to an upper portion of the bracket via a shaft section that serves as the rotation center shaft for supporting the movable shade in the front-back direction. The movable shade includes: a front-side rotation restricting section that abuts a front side surface of the bracket to restrict the rotation of the movable shade to the front at the time when the movable shade rotates to the front and that causes the movable shade to position at the second position; and a rear-side rotation restricting section that abuts a back side surface of the bracket to restrict the rotation of the movable shade to the back at the time when the movable shade rotates to the back.

(13) In the configuration of above (12), the movable shade section includes: a power section that is attached to the bracket and has a moving shaft that moves in a horizontal direction to cause the rotation of the movable shade; and a power-transmitting section that is attached to the bracket to be rotatable in the horizontal direction, is interposed between the movable shade and the moving shaft, and transmits a moving force of the moving shaft as a rotary force of the movable shade.

(14) A vehicle lamp according to the present invention has: a light source; and a shade a shade that has an upper end shaped to form a cutoff line and blocks some of light from the light source. At least a portion of the upper end of the shade where the cutoff line is formed has a thickness smaller than a basic thickness of the shade.

Effect of the Invention

According to the present invention, it is possible to provide the vehicle lamp in which the power-transmission unit can easily be engaged with the moving shaft and the power-transmitting section is unlikely to be disengaged from the moving shaft, and is also possible to provide the vehicle lamp in which the force exerted for the rotation of the movable shade is reduced.

MODE FOR CARRYING OUT THE INVENTION

Figure 1:
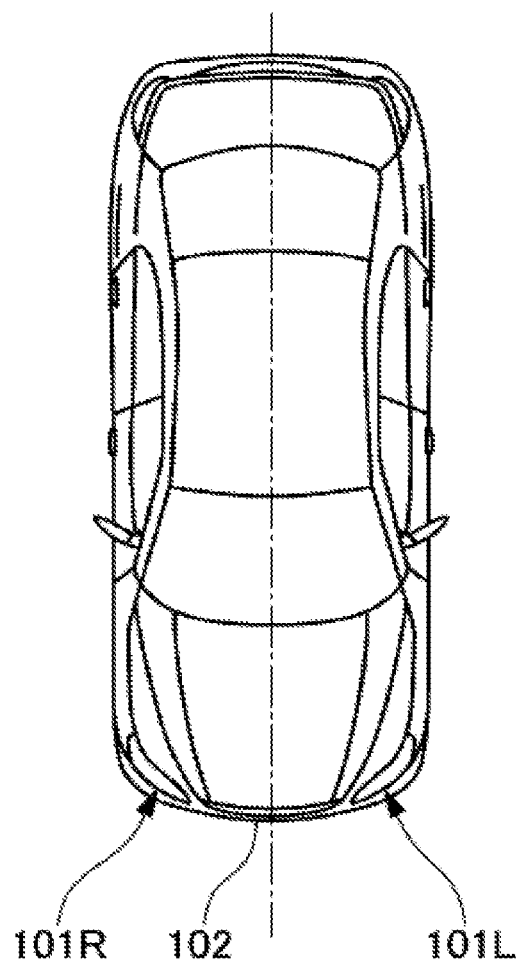
FIG. 1 is a plan view of a vehicle that includes a vehicle lamp according to a first embodiment of the present invention.

Hereinafter, modes for carrying out the present invention (hereinafter, simply referred to as "embodiments") will be described in detail with reference to the accompanying drawings.

The same elements will be denoted by the same reference numerals and symbols throughout the entire description of the embodiments.

In the embodiments and the drawings, unless otherwise noted, "front" and "rear" respectively indicate a "forward direction" and a "reverse direction" of a vehicle, and "up", "down", "left", and "right" indicate directions viewed from a driver in the vehicle.

First Embodiment

A vehicle lamp according to a first embodiment of the present invention is a vehicle headlamp (101R, 1010 provided on left and right sides of a front portion of a vehicle 102 illustrated in FIG. 1, and will hereinafter simply be referred to as the vehicle lamp.

The vehicle lamp of the present embodiment includes: a housing (not illustrated) opened to a vehicle front side; and an outer lens (not illustrated) attached to the housing in a manner to cover the opening. A lamp unit 10 (see FIG. 2) and the like are disposed in a lamp chamber that is formed of the housing and the outer lens.

Figure 2:
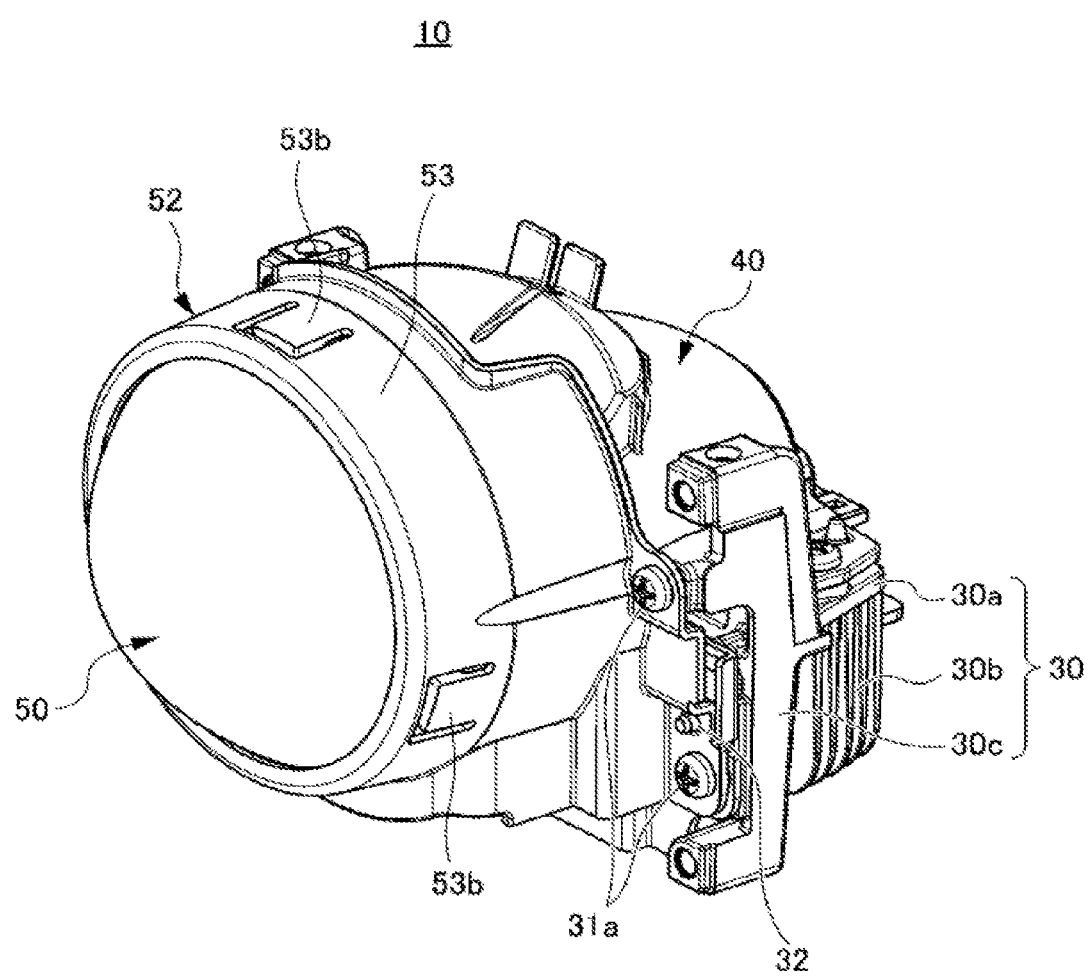
FIG. 2 is a perspective view of a lamp unit according to the first embodiment of the present invention.
Figure 3:
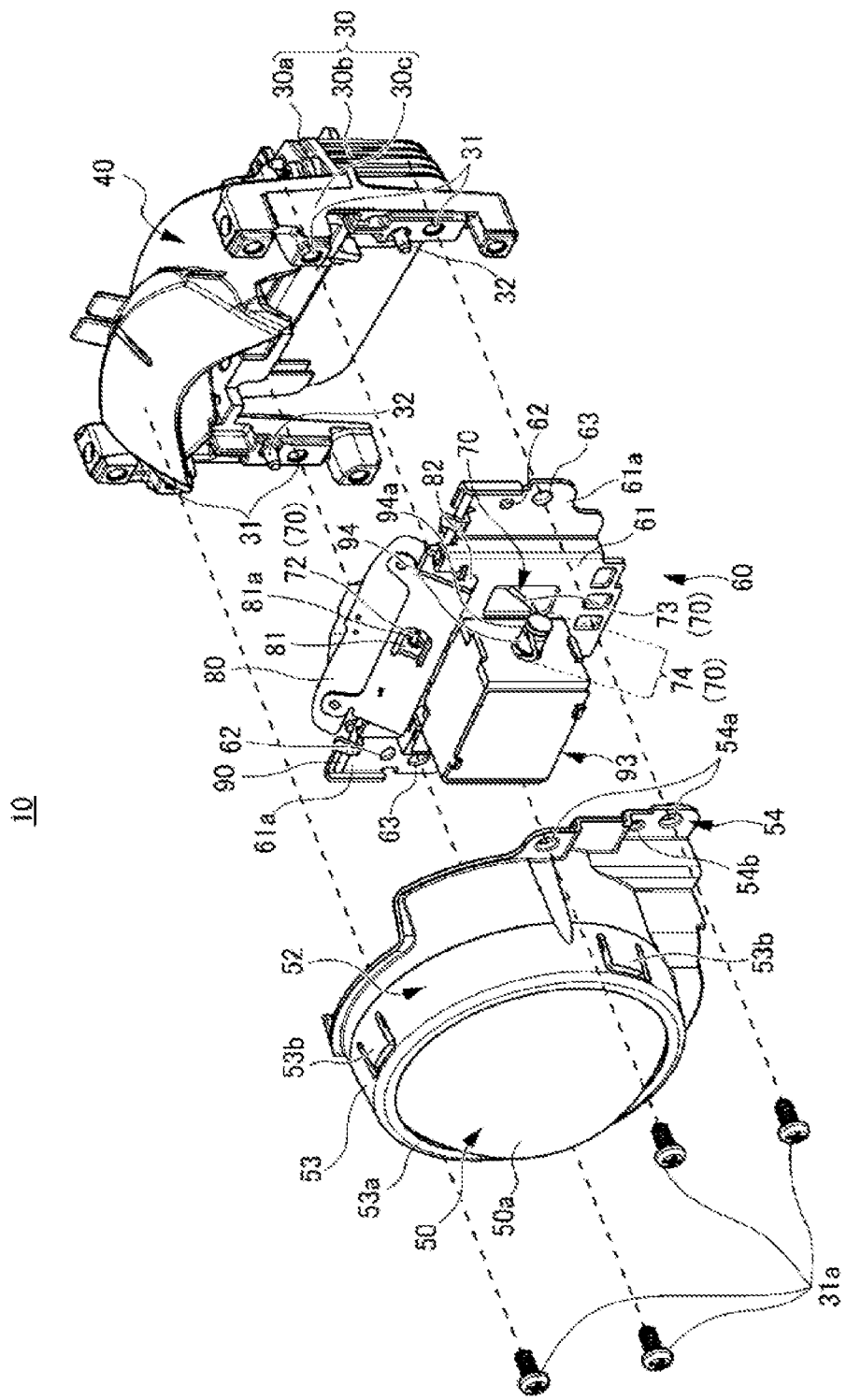
FIG. 3 is a partial exploded perspective view of the lamp unit according to the first embodiment of the present invention.
Figure 4:
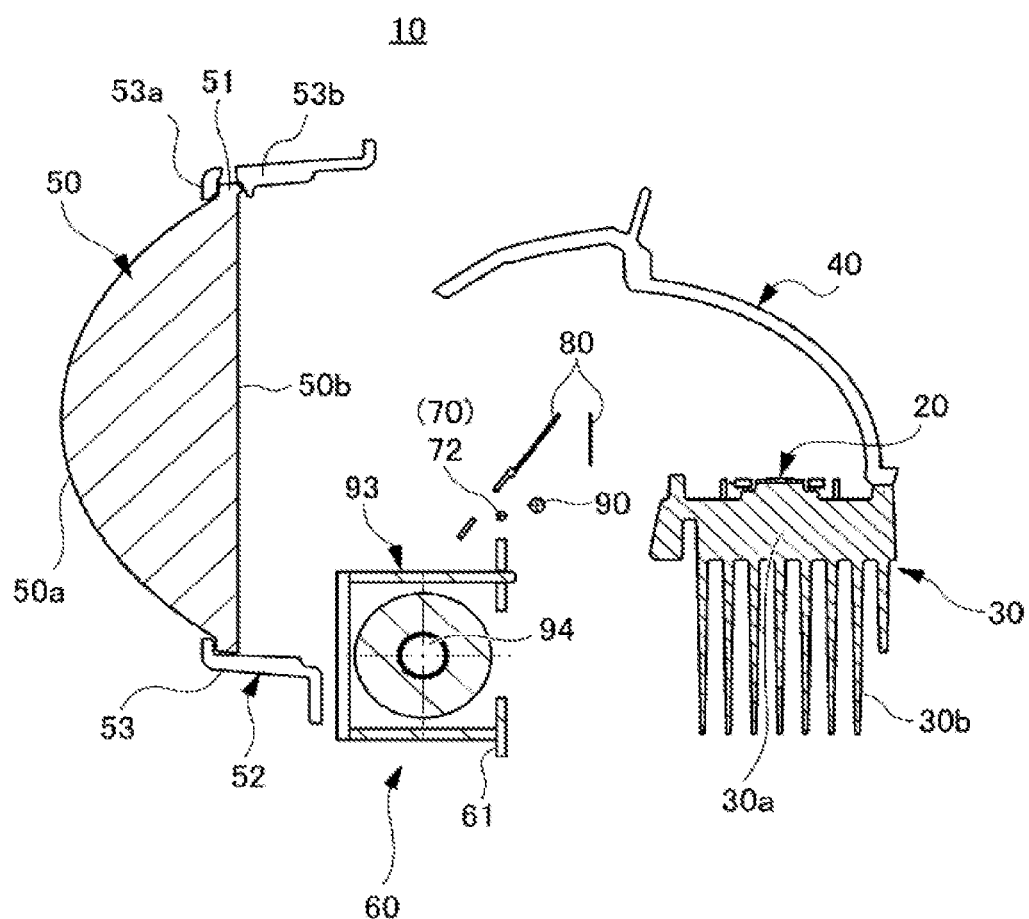
FIG. 4 is a cross-sectional view of the lamp unit according to the first embodiment of the present invention.

FIG. 2 is a perspective view of the lamp unit 10 of the vehicle lamp according to the present embodiment, FIG. 3 is a partial exploded perspective view of the lamp unit 10, and FIG. 4 is a cross-sectional view of the lamp unit 10 that is cut along a center of the lamp unit 10 in a horizontal direction (a right-left direction).

In FIG. 4, in order to promote visibility of the drawing, components located in a cross-sectional portion are illustrated, and a portion on a back side of the cross section is not illustrated.

As shown in FIG. 3 and FIG. 4, the lamp unit 10 includes: a light source 20 (see FIG. 4); a heat sink 30 on which the light source 20 is disposed; a reflector 40 that is disposed on the heat sink 30 and reflects light from the light source 20 to front; a lens 50 that is disposed in front of the light source 20 and emits the light to the front; a lens holder 52 used to attach the lens 50 to the heat sink 30; and a movable shade section 60 that is disposed between the lens 50 and the light source 20 to switch a light distribution pattern.

(Light Source 20)

The light source 20 is a semiconductor-type light source in which a light emitting chip is provided on a substrate, and an LED is used in the present embodiment.

A shape and number of the light emitting chip used on the substrate are not particularly limited. For example, a plurality of square light emitting chips may be arranged side-by-side on the substrate to form a rectangular light emitting surface, or one rectangular light emitting chip may be disposed on the substrate to form the rectangular light emitting surface.

Alternatively, the single square light emitting chip may be disposed on the substrate to form a square light emitting surface.

The case of using the LED is described in the present embodiment. However, a semiconductor-type light source such as an LD or an EL (an organic EL) may be used.

(Heat Sink 30)

As illustrated in FIG. 4, the heat sink 30 includes: a base section 30a on which the light source 20 is disposed; a plurality of heat radiation fins 30b that is provided in a manner to extend downward in a vertical direction from the base section 30a and be aligned in a front-back direction of the vehicle; and, as illustrated in FIG. 3, an attachment section 30c that is positioned in front of the base section 30a and the heat radiation fins 30b and provided on left and right sides in the horizontal direction, and to which the movable shade section 60 and the lens holder 52 are attached.

As illustrated in FIG. 3, in order to tighten screws 31a, the attachment section 30c has a total of four screw tightening holes 31 in which two screw tightening holes 31, which are paired in the horizontal direction, are provided on an upper side and a lower side in the vertical direction. In addition, the attachment section 30c is provided with a left and right pair of two positioning pins 32 in the horizontal direction.

(Reflector 40)

As illustrated in FIG. 4, the reflector 40 is provided on the base section 30a of the heat sink 30 to cover a portion above the light source 20 in a semi-dome shape, and reflects the light from the light source 20 to the front in a manner to produce a specified light distribution pattern.

(Lens 50)

For example, the lens 50 is made of a transparent material such as an acrylic resin, a polycarbonate resin, or glass.

In the present embodiment, an aspheric lens that has a substantially circular shape as viewed from the front is used as the lens 50. As illustrated in FIG. 4, the lens 50 includes: a light emission surface 50a as a curved surface that is projected to the front, to which the light is emitted; and a substantially flat incident surface 50b on which the light is incident.

However, the lens 50 need not be limited to the aspheric lens, and may be a lens other than the aspheric lens.

In addition, as illustrated in FIG. 4, the lens 50 includes, on an outer circumference thereof, a flange section 51 which is held by the lens holder 52.

(Lens Holder 52)

The lens holder 52 is a member that is interposed between the lens 50 and the heat sink 30 and used to attach the lens 50 to the heat sink 30.

Thus, the lens holder 52 includes: a cylindrical lens fixing section 53 used to fix the lens 50; and an attachment section 54 that is provided on the heat sink 30 side of the lens fixing section 53 so as to be attached to the heat sink 30.

As illustrated in FIG. 3 and FIG. 4, in order to fix the lens 50, the lens fixing section 53 includes: a peripheral edge section 53a that abuts the flange section 51 of the lens 50; and a holding piece 53b that holds the flange section 51b of the lens 50 with the peripheral edge section 53a.

A left and right pair of the attachment sections 54 is provided on the heat sink 30 side of the lens fixing section 53 in a manner to correspond to the left and right pair of the attachment sections 30c of the heat sink 30.

The attachment sections 54 include; screw holes 54a that correspond to the four screw tightening holes 31 provided in the attachment sections 30c of the heat sink 30; and positioning holes 54b that correspond to the two positioning pins 32 provided in the attachment sections 30c of the heat sink 30.

Meanwhile, as illustrated in FIG. 3, a bracket 61 of the movable shade section 60, which will be described later, has a pair of flange sections 61a provided on the left and right sides in the horizontal direction. The pair of the flange sections 61a is provided with: positioning holes 62 that correspond to the pair of the positioning pins 32 of the heat sink 30; and screw holes 63 that are provided on the lower side of the positioning holes 62 in the vertical direction and correspond to the pair of the screw tightening holes 31 in a lower portion of the heat sink 30 in the vertical direction.

Accordingly, after the positioning pins 32 of the heat sink 30 are inserted through the positioning holes 62 of the movable shade section 60 so as to assemble the movable shade section 60 to the heat sink 30, the positioning pins 32 of the heat sink 30 are inserted through the positioning holes 54b of the lens holder 52, to which the lens 50, is attached so as to assemble the lens holder 52 to the heat sink 30, and, lastly, the screws 31a are inserted through the screw holes 54a and the screw holes 63 of the lens holder 52 and the movable shade section 60 so as to screw the screws 31a in the screw tightening holes 31 of the heat sink 30 and tighten the screws 31a. In this way, the lamp unit 10 is brought into a state illustrated in FIG. 2.

(Movable Shade Section 60)

Figure 5:
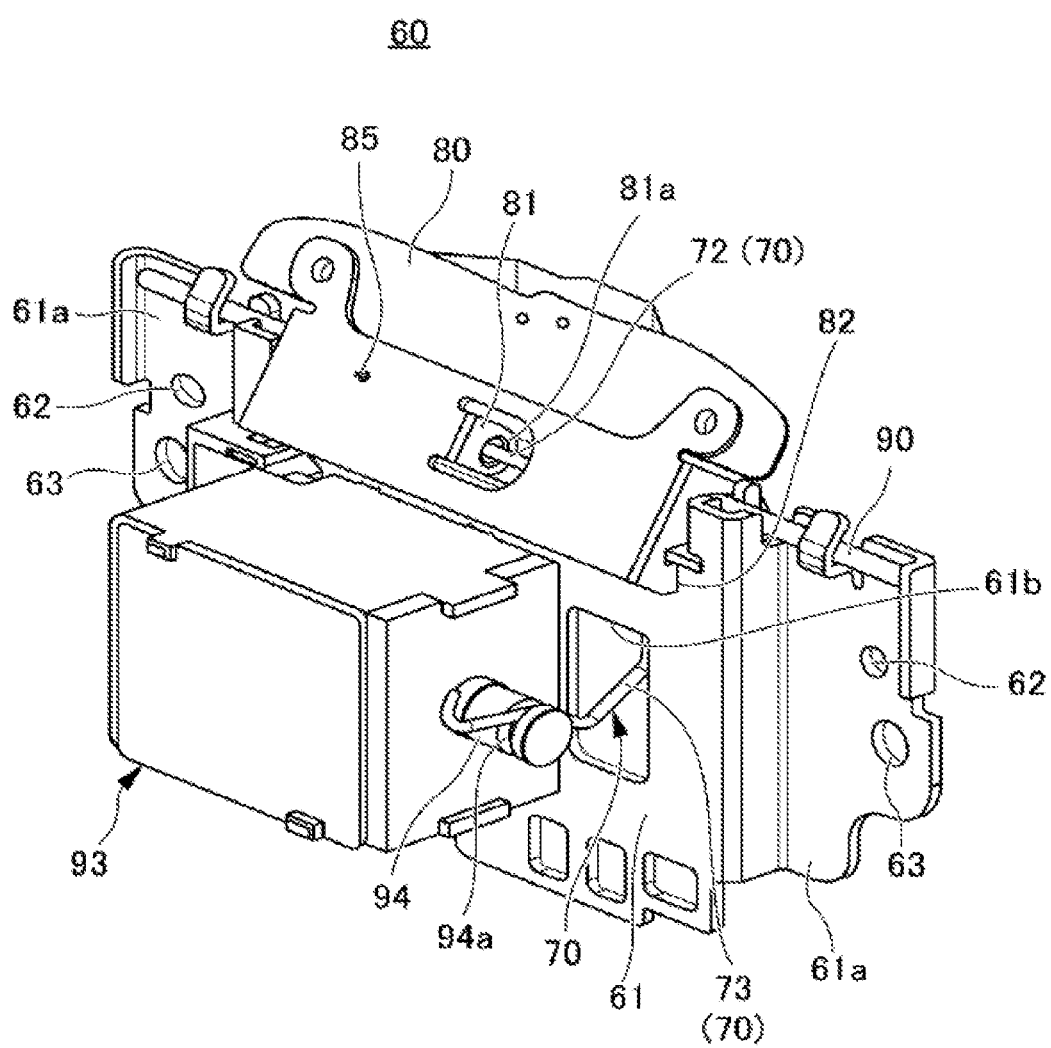
FIG. 5 is a perspective view of a movable shade section according to the first embodiment of the present invention.
Figure 6:
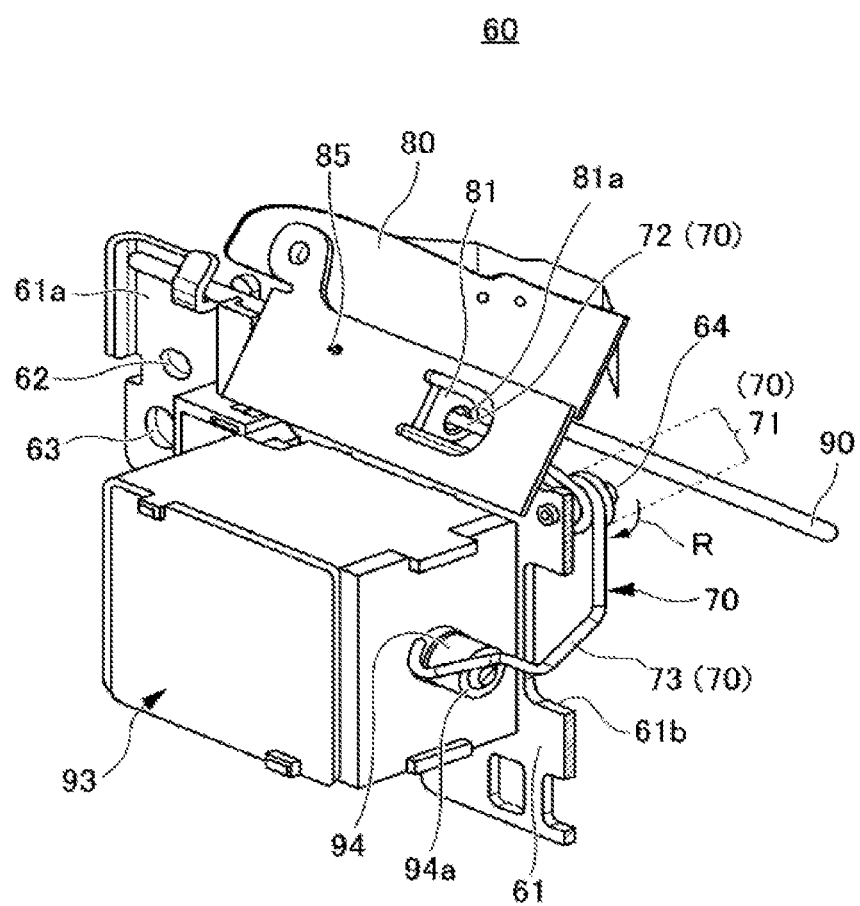
FIG. 6 is a perspective view of a cross section of the movable shade section according to the first embodiment of the present invention.

FIG. 5 is a perspective view of the movable shade section 60, and FIG. 6 is a perspective view of a cross section of the movable shade section 60.

FIG. 5 and FIG. 6 illustrate a state where a movable shade 80, which will be described later, is located at a second position for blocking some of the light from the light source 20. FIG. 6 is a cross-sectional view that is cut along an engagement groove 94a formed on an outer circumference of a moving shaft 94, which will be described later, in the front-back direction.

As illustrated in FIG. 5, the movable shade section 60 includes: the bracket 61; a power-transmitting section 70; the movable shade 80; a shaft section 90 that serves as a rotation center shaft for supporting the movable shade 80 to be rotatable in the front-back direction; a torsion coil spring 85 that urges the movable shade 80 to the front so as to position the movable shade 80 at the second position; and a power section 93 that is attached to a front side surface of the bracket 61 and has the moving shaft 94 moving in the horizontal direction to cause the rotation of the movable shade 80.

In the present embodiment, the case where a solenoid is used as the power section 93 is described. However, the power section 93 is not limited to the solenoid, and may be a component causing the moving shaft 94 to move in the horizontal direction that is substantially orthogonal to the front-back direction.

In addition, in the present embodiment, the movable shade 80 is rotatably supported by the shaft section 90, which supports the movable shade 80 to be rotatable in the front-back direction, and the shaft section 90 is fixed to an upper portion of the bracket 61. In this way, the movable shade 80 is attached to the upper portion of the bracket 61 via the shaft section 90. However, the movable shade 80 need not be limited to such an aspect.

For example, the movable shade 80 and the shaft section 90 may be integrated, and instead, the shaft section 90 may rotatably be attached to the upper portion of the bracket 61.

Figure 7:
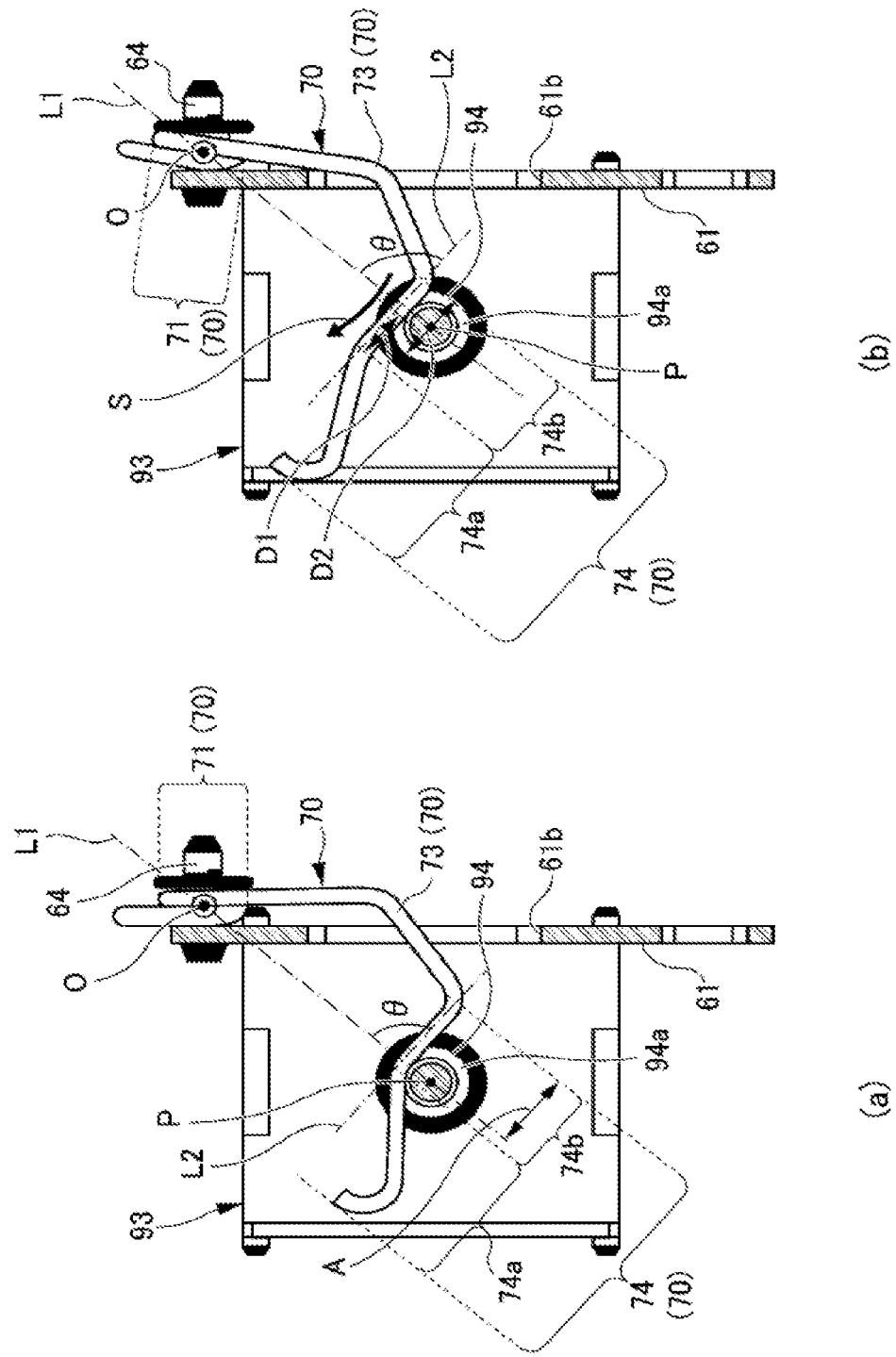
FIG. 7 includes partial side views of the movable shade section according to the first embodiment of the present invention, in which (a) is a view of a state where the power-transmitting section has a normal posture and (b) is a view of a state where the power-transmitting section has a tilted posture.

FIG. 7 includes partial side views of the movable shade section 60 in which some of the members such as the movable shade 80 and the shaft section 90 are not illustrated. FIG. 7(a) is a view of a state where the power-transmitting section 70 has a normal posture, and FIG. 7(b) is a view of a state where the power-transmitting section 70 has a tilted posture.

Note that FIG. 7 include the side views in each of which the state illustrated in the cross-sectional view of FIG. 6 is viewed from the side of the movable shade section 60.

Figure 8:
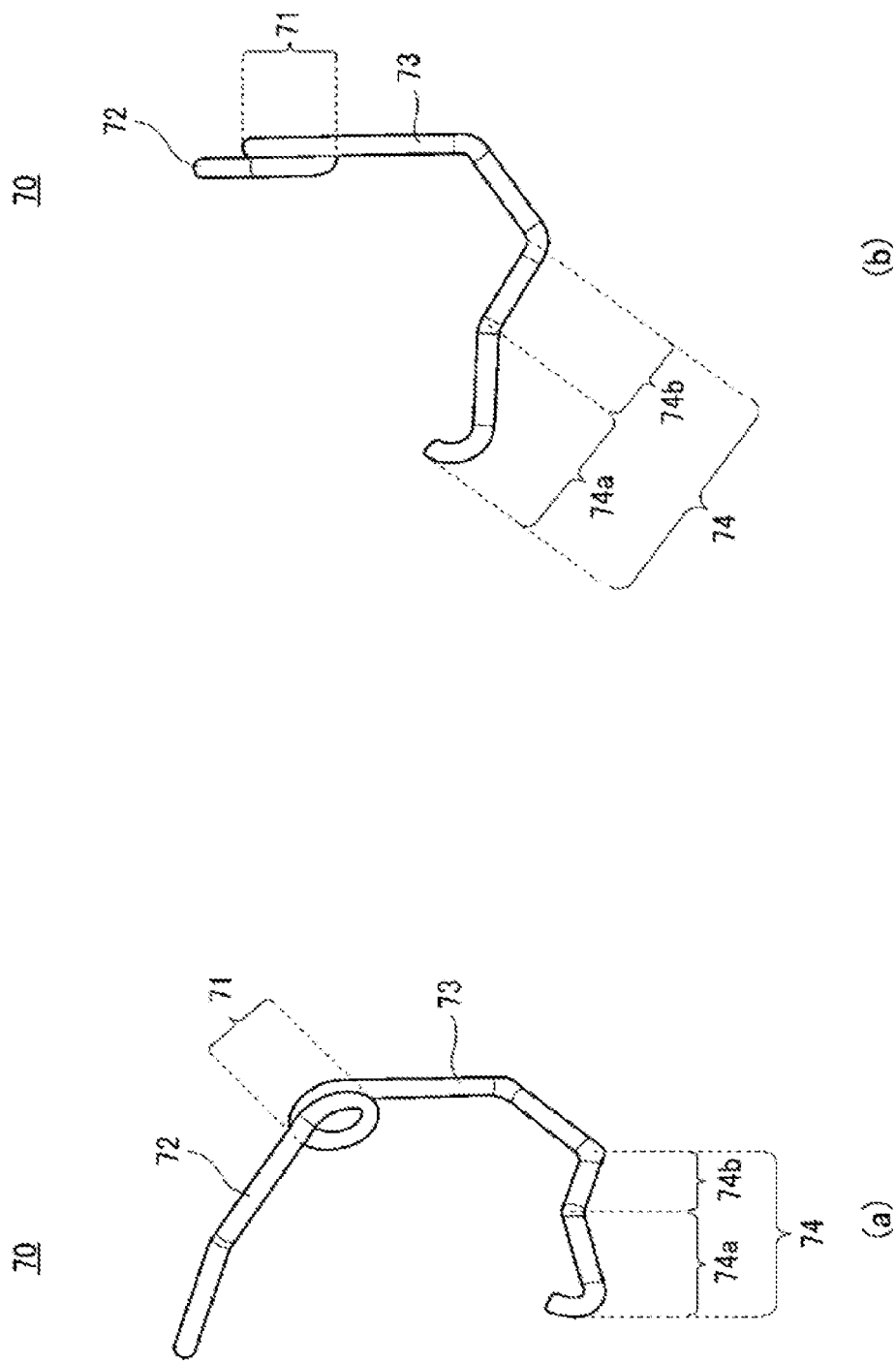
FIG. 8 includes views of the power-transmitting section according to the first embodiment of the present invention, in which (a) is a perspective view thereof and (b) is a side view thereof.

FIG. 8 includes views of the power-transmitting section 70, in which FIG. 8(a) is a perspective view of the power-transmitting section 70 and FIG. 8(b) is a side view of the power-transmitting section 70.

The power-transmitting section 70 is a portion that is interposed between the movable shade 80 and the moving shaft 94 of the power section 93 and transmits a horizontal moving force of the moving shaft 94 as a force that causes the rotation of the movable shade 80 in the front-back direction.

More specifically, as illustrated in FIG. 7 and FIG. 8, the power-transmitting section 70 includes a bearing section 71 that is provided in an intermediate portion thereof, and the bearing section 71 is supported by a support shaft 64, which extends backward in the front-back direction from a back side surface of the bracket 61, in a manner to rotate in the horizontal direction that is orthogonal to the front-back direction.

In addition, the power-transmitting section 70 includes: a first arm 72 that extends from the bearing section 71 toward the movable shade 80 (see FIG. 6) side and is engaged with an engagement hole 81a (see FIG. 6) of an engagement section 81 (see FIG. 6) in the movable shade 80 (see FIG. 6); and a second arm 73 that extends from the bearing section 71 toward the moving shaft 94 side and has an engagement section 74 that is slidably engaged with the engagement groove 94a.

In detail, the power-transmitting section 70 is formed by bending a rigid wire and includes: in the intermediate portion, the bearing section 71 as a bent portion in a loop shape so as to form a loop through which the support shaft 64 is inserted; and the first arm 72 that is provided substantially linearly from the bearing section 71 toward the movable shade 80 while a tip side thereof is slightly bent so as to be inserted in the engagement hole 81a in the substantially horizontal direction.

Furthermore, as illustrated in FIG. 7(a), the power-transmitting section 70 includes the second arm 73 that extends downward in the vertical direction from the bearing section 71 in the state of the normal posture that is not tilted in the front-back direction, then extends obliquely downward to the front in a manner to extend below a center of the moving shaft 94 in the vertical direction as viewed at a position in the vertical direction, and is thereafter formed with the engagement section 74 extending above the engagement groove 94a. The second arm 73 extends toward the moving shaft 94 after detouring downward in the vertical direction from the bearing section 71.

As illustrated in FIG. 5, the bracket 61 has a lead-out section 61b formed as an opening through which the engagement section 74 (see FIG. 7 and FIG. 8) of the second arm 73 in the power-transmitting section 70 is led out to be positioned on the front side. The lead-out section 61b is formed in such size that does not hinder motion of the second arm 73 associated with movement of the moving shaft 94 in the power section 93.

However, the lead-out section 61b need not be limited to the opening formed in the bracket 61, and the lead-out section 61b may be a notch that is formed in the bracket 61.

As illustrated in FIG. 7(a), the engagement section 74, which is provided on a tip side of the second arm 73, includes: a first engagement section 74a on a foremost side that is engaged with the engagement groove 94a and extends in the front-back direction in the state of the normal posture not tilted in the front-back direction; and a second engagement section 74b that has a substantially linear shape, is engaged with the engagement groove 94a, and is connected to and bent with respect to the first engagement section 74a.

In the present embodiment, a foremost portion of the first engagement section 74a is curled upward. However, this is not a requirement. The curled portion may be omitted, and the first engagement section 74a may have a substantially linear shape.

Next, a further detailed configuration will be described while a description will also be made on a state at the time when the movable shade 80 is switched between a first position and the second position, and the like.

In this embodiment, the solenoid is used as the power section 93. Thus, when electricity is supplied to the solenoid, the moving shaft 94 moves in a direction to be retracted into the power section 93. Then, when the electricity stops being supplied, the moving shaft 94 moves in a direction to stick out from the power section 93.

That is, the moving shaft 94 moves in the horizontal direction depending on whether the electricity is supplied to the power section 93 so as to drive the power section 93.

A state illustrated in FIG. 5 and FIG. 6 is a state at the time when the power section 93 is not driven. At this time, the movable shade 80 rotates forward by an urging force of the torsion coil spring 85, which urges the movable shade 80 to the front, and an arm section 82 that functions as a section restricting the rotation of the movable shade 80 abuts the front side surface of the bracket 61. In this way, the movable shade 80 is placed at the second position where the movable shade 80 is brought into a state of being lifted to block some of the light from the light source 20.

As described above, when the movable shade 80 is positioned at the second position by not driving the power section 93, the power-transmitting section 70 is in the state of the posture not tilted in the front-back direction illustrated in FIG. 7(a), and both of the first engagement section 74a and the second engagement section 74b are brought into states of being fitted to and engaged with the engagement groove 94a, which is formed on the outer circumference of the moving shaft 94.

In the present embodiment, the engagement groove 94a is formed as a groove that goes around the entire outer circumference of the moving shaft 94. However, the engagement groove 94a may be formed in a necessary range of the outer periphery of the moving shaft 94.

Meanwhile, when the electricity is supplied to the power section 93 and the power section 93 is brought into a driven state, as described above, the moving shaft 94 moves to the power section 93 side.

Then, as illustrated in FIG. 6, the second arm 73 is drawn to the power section 93 side in conjunction with the movement of the moving shaft 94 to the power section 93 side. Consequently, the power-transmitting section 70 rotates about the bearing section 71 in the horizontal direction as indicated by an arrow R, and the first arm 72 moves upward in the vertical direction.

When the first arm 72 moves upward in the vertical direction, just as described, a force that pushes up the engagement section 81 of the movable shade 80 is exerted thereon and causes the rotation of the movable shade 80 in the front-back direction in a manner to rotate about the shaft section 90. Then, the position of the movable shade 80 is switched to the first position at which the movable shade 80 is in the tilted state of not blocking the light from the light source 20.

Also, in this case, basic motion of the power-transmitting section 70 is the horizontal rotation about the bearing section 71 (see the arrow R in FIG. 6). Thus, the power-transmitting section 70 is maintained in the state of having the posture not tilted in the front-back direction, which is illustrated in FIG. 7(a).

However, in order to allow the smooth horizontal rotation of the power-transmitting section 70 about the bearing section 71, the bearing section 71 is engaged with the support shaft 64 in a manner to allow rattling thereof to some extent with respect to the support shaft 64. Thus, as illustrated in FIG. 7(b), there is a case where, due to vibrations of the vehicle 102 or the like, the power-transmitting section 70 rotates in the front-back direction (see an arrow S) within such a range where the rattling is allowed.

In such a case, the first engagement section 74a is disengaged from the engagement groove 94a. Thus, in the case where the first engagement section 74a is engaged with the engagement groove 94a, the power-transmitting section 70 is brought into a state of being no longer engaged with the moving shaft 94, which leads to operation failure. However, in the case of the present embodiment, since the second engagement section 74b remains to be engaged with the engagement groove 94a, occurrence of the operation failure can be suppressed.

Here, in order to simply avoid the state of the power-transmitting section 70 not being engaged with the moving shaft 94, it is possible to omit the first engagement section 74a and provide the second engagement section 74b.

However, in recent years, downsizing of the vehicle lamp is requested, and the use of the large-sized power section 93, which generates the large driving force, is not preferable. Thus, it is important to reduce a load exerted on the power section 93 during driving of the moving shaft 94, and in order to cause the horizontal rotation of the power-transmitting section 70 with the small load, the first engagement section 74a, which is parallel with the center axis of the rotation, is used. In this way, the power-transmitting section 70 can rotate without the large load being exerted on the power section 93.

Therefore, it is preferable to provide the second engagement section 74b and additionally provide the first engagement section 74a so that the power-transmitting section 70 can rotate without the large load being exerted on the power section 93.

Meanwhile, as the second engagement section 74b is brought closer to a state of being orthogonal to the center axis of the horizontal rotation of the power-transmitting section 70, the second engagement section 74b is tightened and inhibits the movement of the moving shaft 94 at the time when the second engagement section 74b is twisted.

For such a reason, it is ideal that, even when rotation as indicated by the arrow S occurs, the second engagement section 74b can be engaged with the engagement groove 94a while keeping the substantially same posture such that the second engagement section 74b is unlikely to be disengaged from the engagement groove 94a in conjunction with the rotary motion of the power-transmitting section 70 in the front-back direction and does not become a cause of tightening or the like.

That is, the second engagement section 74b is formed such that the second engagement section 74b can slide on the engagement groove 94a smoothly without significantly changing the posture.

Here, it may be easily understood when imagining a plate that is held between two rollers and is smoothly fed thereby. In the case where the second engagement section 74b is formed to be in a state of defining a tangent line to both of a circle drawn by the rotation indicated by the arrow S and a circle of the engagement groove 94a, the second engagement section 74b can slide on the engagement groove 94a smoothly without significantly changing the posture. A specific description will hereinafter be made thereon.

As it is understood from FIG. 7(b), in the case where the power-transmitting section 70 rotates in the front-back direction, a rotation fulcrum O of such rotation is located at a substantially center position of the bearing section 71 when the bearing section 71 supported by the support shaft 64 is viewed in the side view in which the movable shade section 60 is viewed from the side.

In the side view, which is illustrated in FIG. 7 and in which the movable shade section 60 is viewed from the side, when a straight line that connects the rotation fulcrum O at the time when the power-transmitting section 70 rotates in the front-back direction and a center point P of a cross section of the moving shaft 94 is set as a reference line L1, a line L2 that is positioned on the engagement groove 94a and is orthogonal to this the reference line L1 is a tangent to a circle centered on the rotation fulcrum O, and is also a tangent to the engagement groove 94a.

Accordingly, the second engagement section 74b is formed such that an angle θ on the rotation fulcrum O side, which is formed by the reference line L1 and a portion (a portion corresponding to a range A in FIG. 7(a)) of the second engagement section 74b on an opposite side to the first engagement section 74a relative to an intersection point where the second engagement section 74b and the reference line L1 intersect with each other, becomes 90 degrees. In this way, as described above, the second engagement section 74b can slide on the engagement groove 94a smoothly without significantly changing the posture.

However, it is not realistic to form the second engagement section 74b such that the angle θ is accurately set to 90 degrees. Thus, when a manufacturing error and the like are considered, the second engagement section 74b is formed such that the angle θ is set to equal to or larger than 80 degrees and equal to or smaller than 110 degrees. The second engagement section 74b is further formed such that the angle θ is set to equal to or larger than 84 degrees and equal to or smaller than 106 degrees.

Meanwhile, in the case where the engagement groove 94a has an excessively small width, the sliding of the second engagement section 74b becomes poor. On the contrary, in the case where the engagement groove 94a has an excessively large width, the rattling is likely to occur. Thus, the engagement groove 94a is formed to have the width that is equal to or larger than 1.1 times and equal to or smaller than 1.5 times a diameter of a cross section of the power-transmitting section 70.

Here, in the case where a length of the second engagement section 74b is short, the second engagement section 74b is disengaged from the engagement groove 94a at the time when the power-transmitting section 70 rotates in the front-back direction. Thus, it is important that the second engagement section 74b has such a length that the second engagement section 74b is not disengaged from the engagement groove 94a at the time of sliding along the engagement groove 94a in association with the rotation of the power-transmitting section 70 in the front-back direction.

For example, a distance D1 (see FIG. 7(b)) for which the second engagement section 74b slides along the engagement groove 94a in association with the rotation of the power-transmitting section 70 in the front-back direction from a state in FIG. 7(a) to a state in FIG. 7(b) is slightly shorter than a diameter D2 of the moving shaft 94.

Accordingly, in order to prevent the disengagement of the second engagement section 74b from the engagement groove 94a at the time when the second engagement section 74b slides along the engagement groove 94a in association with the rotation of the power-transmitting section 70 in the front-back direction, the length of the second engagement section 74b is the same as the diameter D2 of the moving shaft 94 or longer than the diameter D2 of the moving shaft 94.

According to the vehicle lamp having the configuration as described above, the engagement section 74 of the power-transmitting section 70 only is fitted to the engagement groove 94a by dropping the engagement section 74 on the engagement groove 94a. Thus, the power-transmitting section 70 can easily be engaged with the moving shaft 94, and, as described above, the power-transmitting section 70 is unlikely to be disengaged from the moving shaft 94.

Second Embodiment

Next, a description will be made on a vehicle lamp according to a second embodiment of the present invention with reference to FIG. 9 to FIG. 13.

A basic configuration of the vehicle lamp according to the present embodiment is the same as that of the vehicle lamp according to the first embodiment. Thus, a description will hereinafter be made mainly on different points, and the same points as the first embodiment may not be described.

Also, in the present embodiment, similar to the first embodiment, the solenoid is used as the power section 93, and a plunger of the solenoid serves as the moving shaft 94. However, the power section 93 need not be limited to the solenoid. Similar to the above description, the power section 93 has to cause the movement of the moving shaft 94.

Figure 9:
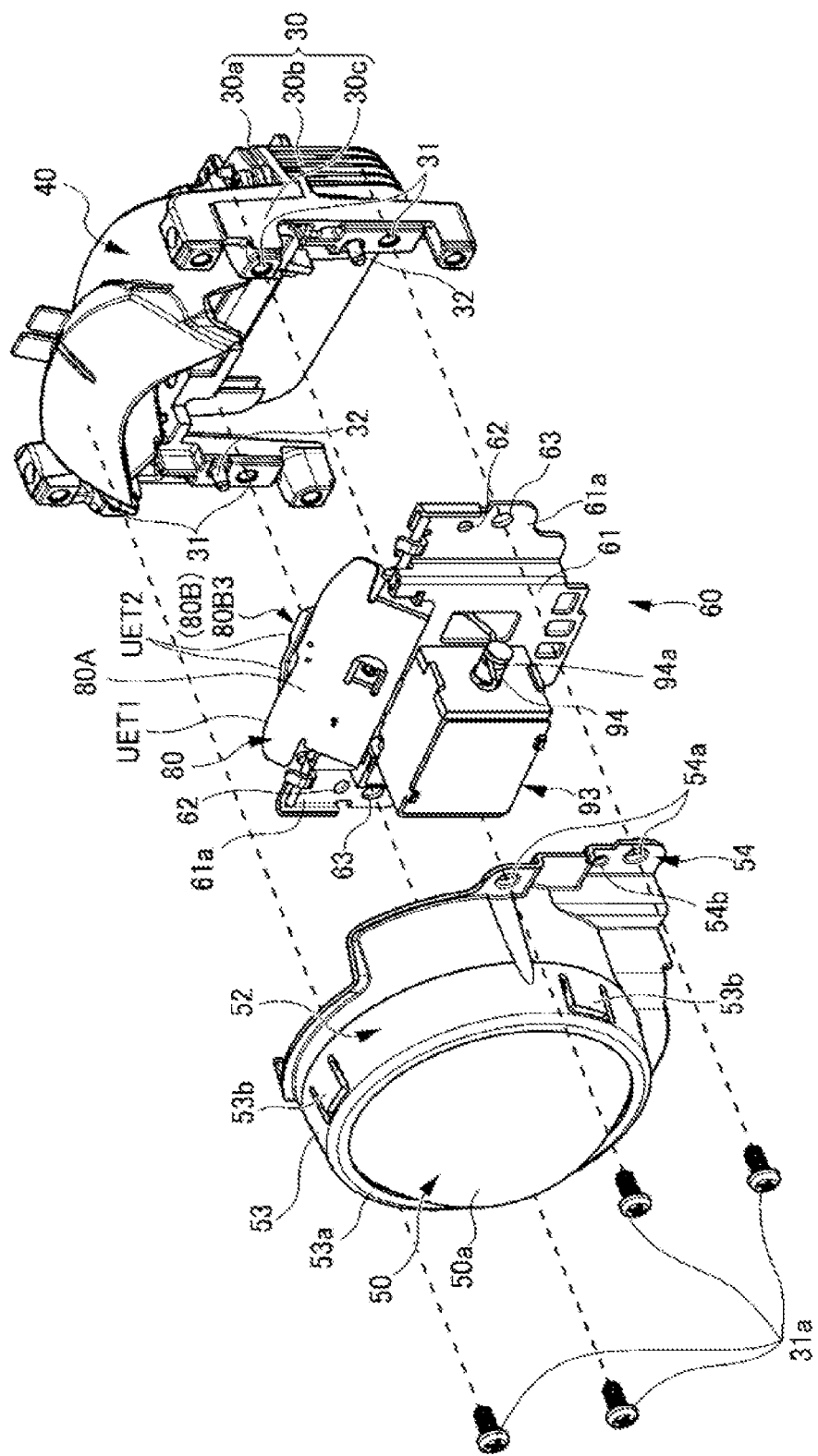
FIG. 9 is a partial exploded perspective view of a lamp unit according to a second embodiment of the present invention.

FIG. 9 is a partial exploded perspective view of the lamp unit 10 according to the second embodiment, and is a view that corresponds to FIG. 3.

As it is understood from comparison between FIG. 3 and FIG. 9, the lamp unit 10 in the second embodiment has the substantially same configuration as the lamp unit 10 in the first embodiment. More specifically, the configuration of the movable shade 80 partially differs.

Thus, a detailed description will hereinafter be made on the movable shade 80 in the second embodiment with reference mainly to FIG. 10 to FIG. 13.

Figure 10:
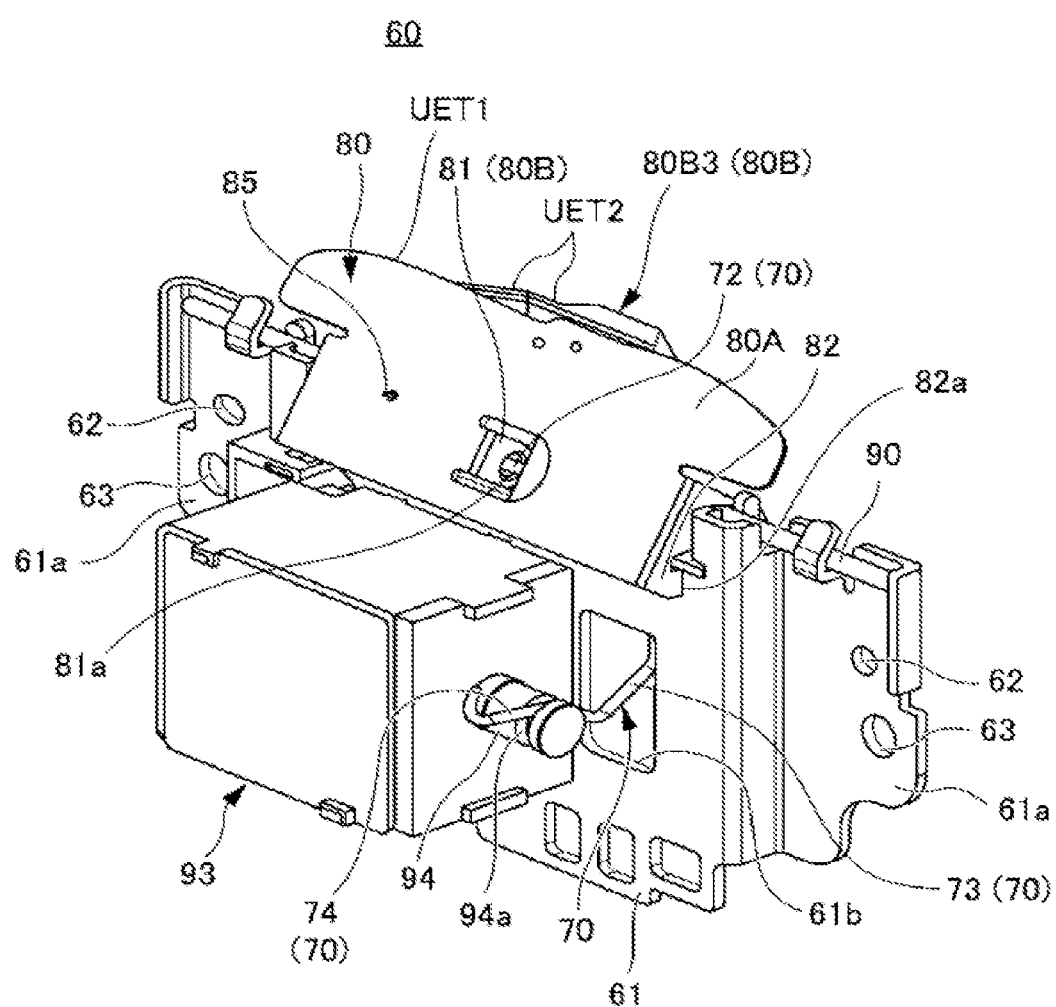
FIG. 10 is a perspective view of a movable shade section according to the second embodiment of the present invention.

FIG. 10 is a perspective view of the movable shade section 60, illustrates the state where the movable shade 80 is positioned at the second position where the movable shade 80 blocks some of the light from the light source 20, and is a view that corresponds to FIG. 5.

Figure 11:
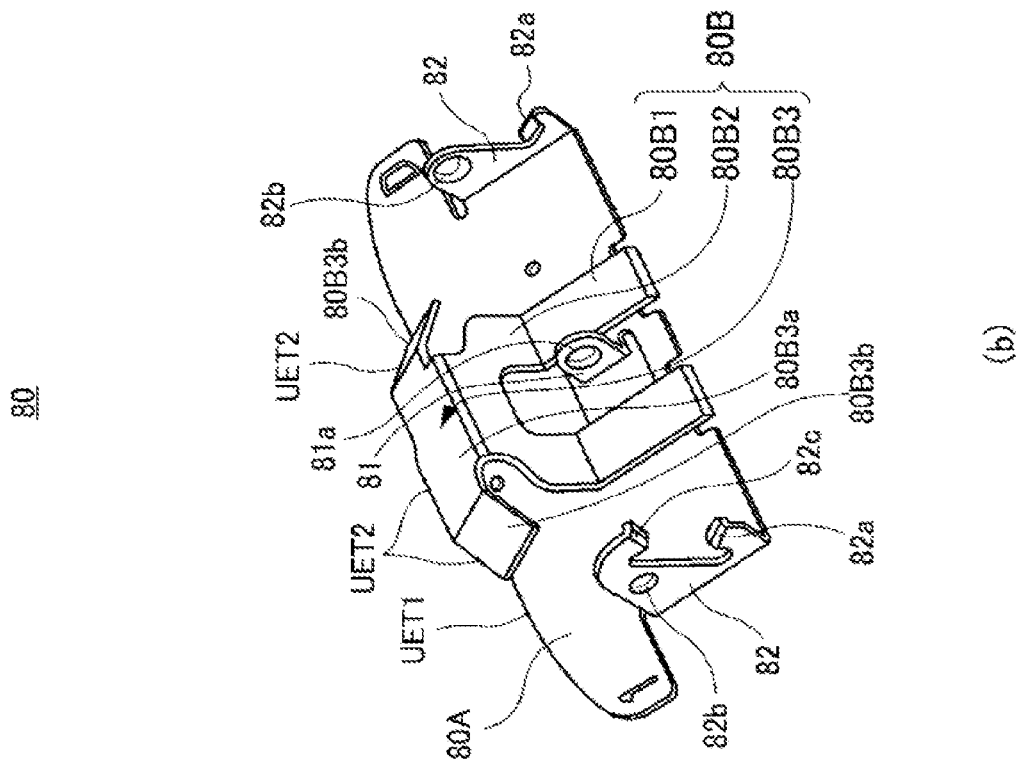
FIG. 11 includes perspective views of a movable shade according the second embodiment of the present invention, in which (a) is a perspective view in which a front portion of the movable shade is mainly viewed and (b) is a perspective view in which a rear portion of the movable shade is mainly viewed.
Figure 11:
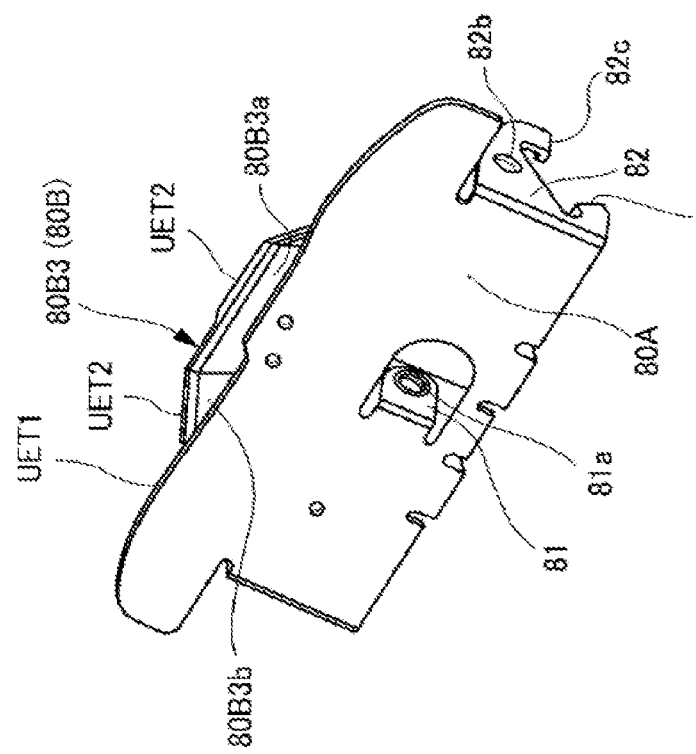

FIG. 11 includes perspective views of the movable shade 80, in which FIG. 11(a) is a perspective view in which a front portion of the movable shade 80 is mainly viewed and FIG. 11(b) is a perspective view in which a rear portion of the movable shade 80 is mainly viewed.

Figure 12:
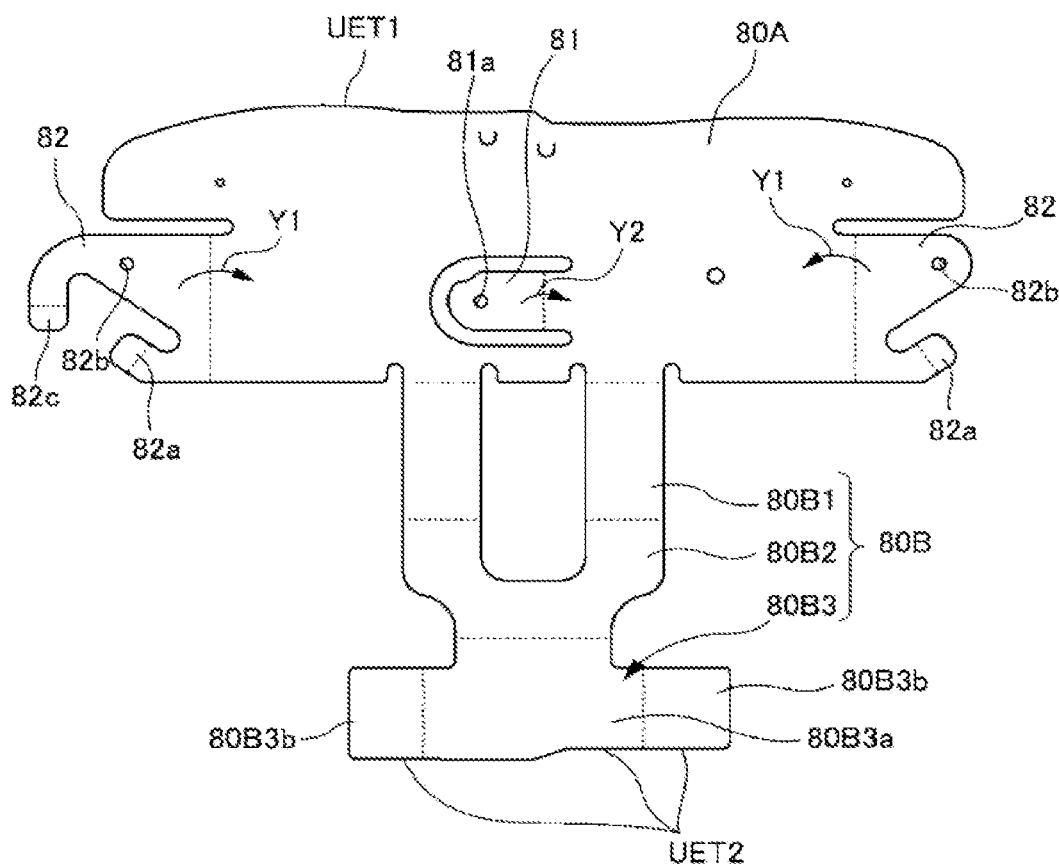
FIG. 12 is a development view of a state before the movable shade according the second embodiment of the present invention is shaped by bending.

Furthermore, FIG. 12 is a development view of a state before the movable shade 80 is shaped by bending, and is a development view that is viewed from the rear portion of the movable shade 80.

In FIG. 12, portions indicated by dotted lines each indicate a position where the bending is performed.

Figure 13:
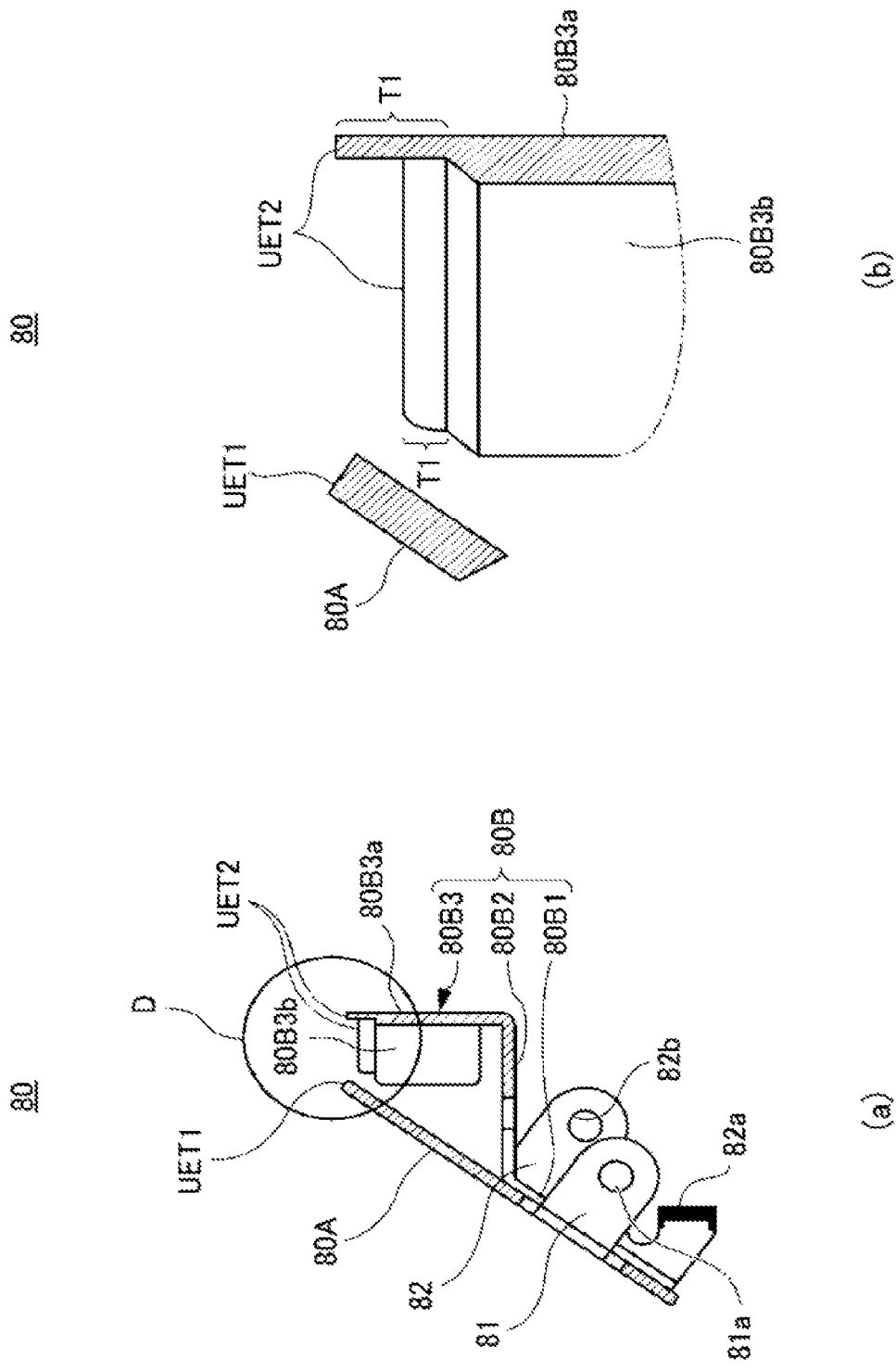
FIG. 13 includes side views of the movable shade according the second embodiment of the present invention as viewed from the side, in which (a) is a view that is cut along a center of the movable shade in a right-left direction and (b) is an enlarged view of a circled portion D in (a).

FIG. 13 includes side views of the movable shade 80 as viewed from the side, in which FIG. 13(a) is a view that is cut along a center of the movable shade 80 in the right-left direction and FIG. 13 (b) is an enlarged view of a circled portion D in FIG. 13(a).

As illustrated in FIG. 11, the movable shade 80 includes: a main body section 80A that has an upper end UET1 having a shape to form cutoff lines; and an auxiliary section 80B that is connected to a lower portion of the main body section 80A in the vertical direction.

The main body section 80A includes: a pair of the arm sections 82 formed on left and right sides of the main body section 80A in a manner to be bent backward as indicated by arrows Y1 in FIG. 12 and has shaft holes 82b, through each of which the shaft section 90 is inserted, the shaft section 90 being the rotation center shaft for supporting to allow the rotation in the front-back direction; and the engagement section 81 that is formed on a center side of the main body section 80A in the right-left direction in a manner to be bent backward as indicated by an arrow Y2 in FIG. 12 and has the engagement hole 81a, with which a tip side of the first arm 72 of the power-transmitting section 70 is engaged.

In addition, each of the arm sections 82 is provided with a front-side rotation restricting section 82a that abuts the front side surface of the bracket 61 to restrict the rotation of the movable shade 80 to the front at the time when the movable shade 80 rotates to the front and that causes the movable shade 80 to position at the second position where the movable shade 80 is brought into the state of being lifted to block some of the light from the light source 20.

The front-side rotation restricting section 82a is bent inward so as to increase an abutment area thereof against the front side surface of the bracket 61.

Meanwhile, one of the arm sections 82 is provided with a rear-side rotation restricting section 82c that abuts the back side surface of the bracket 61 to restrict the rotation of the movable shade 80 to the back at the time when the movable shade 80 rotates to the back.

This the rear-side rotation restricting section 82c is also bent inward so as to increase an abutment area thereof against the back side surface of the bracket 61.

The rear-side rotation restricting section 82c is designed to abut the back side surface of the bracket 61 at the time when the movable shade 80 further rotates to the back from the first position, and is not design to restrict the movable shade 80 to be positioned at the first position.

This is because the rear-side rotation restricting section 82c has to play a role as a stopper that suppresses the movable shade 80 from significantly rotating to the back and being brought into the state where the lower portion of the movable shade 80 blocks the light from the light source 20, and the movable shade 80 is normally positioned at the first position by the motion of the moving shaft 94.

Meanwhile, when viewed in a state where the movable shade 80 illustrated in FIG. 10 and FIG. 13 is positioned at the second position, the auxiliary section 80B includes: a lower portion 80B1 which is located on a back side of the main body section 80A as illustrated in FIG. 13, and at least a part of which is positioned closer to the main body section 80A side than the rotation center shaft (the shaft hole 82b, through which the shaft section 90 as the rotation center shaft is inserted, in FIG. 13(a)); an intermediate portion 80B2 that is bent from the lower portion 80B1 and extends, through a position above the rotation center shaft in the vertical direction, to the back so as to more separate from the main body section 80A than the rotation center shaft; and an upper portion 80B3 that is bent from the intermediate portion 80B2 and extends upward in the vertical direction. The upper portion 80B3 has an upper end UET2 that has a shape, in which cutoff lines are formed.

As shown in FIG. 11(b) and FIG. 13(a), the upper portion 80B3 includes: a central portion 80B3a, a center side of which is substantially orthogonal to the front-back direction and is substantially parallel to the vertical direction; and a left and right pair of lateral portions 80B3b, each of which is bent in a manner to approach the front side from the central portion 80B3a.

In addition, when the movable shade 80 illustrated in FIG. 10 and FIG. 13 is positioned at the second position, at least a portion (see the lower portion 80B1) of the auxiliary section 80B that is lower than the rotation center shaft (see the shaft hole 82b, through which the shaft section 90 as the rotation center shaft is inserted, in FIG. 13(a)) in the vertical direction is bent toward the main body section 80A side so as to be positioned on the main body section 80A side. In the present embodiment, the lower portion 80B1 is bent so as to be in substantially tight contact with the main body section 80A.

For example, in the case where a portion similar to the upper portion 80B3 is fixed to the upper portion of the main body section 80A by caulking or the like, weight of a portion of the main body section 80A above the rotation center shaft (see the shaft hole 82b, through which the shaft section 90 as the rotation center shaft is inserted, in FIG. 13(a)) is increased. As a result, weight balance with respect to the rotation center shaft (see the shaft hole 82b, through which the shaft section 90 as the rotation center shaft is inserted, in FIG. 13(a)) worsens.

However, as in the present embodiment, in the case where the upper portion 80B3 is provided in the auxiliary section 80B, and the auxiliary section 80B on the lower side in the vertical direction is connected to the main body section 80A, the weight of the auxiliary section 80B is applied to the lower portion of the main body section 80A. Thus, it is possible to cancel unevenness of the weight of the main body section 80A, which is relatively heavy in the upper portion, and to improve the weight balance with respect to the rotation center shaft (see the shaft hole 82b, through which the shaft section 90 as the rotation center shaft is inserted, in FIG. 13(a)).

Furthermore, since the lower portion 80B1 is bent toward the main body section 80A so as to be positioned closer to the main body section 80A side than the rotation center shaft (see the shaft hole 82b, through which the shaft section 90 as the rotation center shaft is inserted, in FIG. 13(a)), rotary moment at the time of the rotation can be reduced. Thus, it is possible to reduce the load exerted on the power section 93 during the rotation.

Therefore, according to the present embodiment, it is possible to obtain the vehicle lamp in which the force exerted for the rotation of the movable shade 80 is reduced.

In the present embodiment, the upper portion 80B3, which has the upper end UET2 shaped to form the cutoff lines, is provided to hinder appearance of a spectral color near the cutoff lines. However, from a viewpoint of producing the rotation with the small load, the intermediate portion 80B2 and the upper portion 80B3 may not be provided.

In addition, since the rotary moment during the rotation can be reduced, it is possible to reduce the urging force of the torsion coil spring 85 (see FIG. 10) that urges the movable shade 80 to the front. Thus, it is possible to further reduce the load exerted on the power section 93 during the rotation.

Furthermore, as in the present embodiment, in the case where the movable shade 80 is manufactured by bending a single plate material, processing accuracy is high. Accordingly, compared to a case where a portion corresponding to the upper portion 80B3 in the present embodiment is provided by caulking or the like as in the cited patent literature, positioning accuracy of the upper portion 80B3 can be increased.

Therefore, it is possible to effectively suppress generation of glare light caused by displacement of the upper portion 80B3.

By the way, as it is understood from FIG. 13, when the movable shade 80 is in the state of being positioned at the second position, that is, in the state of blocking some of the light from the light source 20, the upper end UET2 of the upper portion 80B3 becomes a horizontal surface. Thus, in the case where the upper end UET2 of the upper portion 80B3 is thick, the glare light is possibly generated due to the light reflected by the surface of the upper end UET2.

In particular, in the present embodiment, since the movable shade 80 is manufactured by bending the single plate material, a plate material in a basic thickness with which rigidity of such extent that is not affected by the vibrations of the vehicle 102 or the like is used. As a result, the thickness of the upper end UET2 of the upper portion 80B3 tends to be increased.

Here, the rigidity can be increased by bringing the lower portion 80B1 into substantially tight contact with the main body section 80A as in the present embodiment. Thus, the lower portion 80B1 is bent so as to be in substantially tight contact with the main body section 80A.

Thus, as illustrated in FIG. 13(b), a portion of the upper end UET2 of the upper portion 80B3 where the cutoff lines are formed is set to have a thickness smaller than the basic thickness of the movable shade 80 (see a region T1), and is set to have a thickness smaller than a portion of the upper portion 80B3 on the intermediate portion 80B2 side.

As a result, it is possible to suppress the light reflected by the upper end UET2 of the upper portion 80B3 and thus to suppress the generation of the glare light.

Here, a problem of the generation of the glare light by the light reflected by the upper portion of the shade is not a problem limited to the movable shade. Thus, also an upper end of an immovable shade preferably has a thickness smaller than a basic thickness of the shade.

Meanwhile, as it is understood from FIG. 13, the main body section 80A has the inclined posture to the back when the movable shade 80 is in the state of being positioned at the second position, that is, in the state of blocking some of the light from the light source 20.

For this reason, a front edge of the upper end UET1 of the main body section 80A is positioned at the highest, and thus does not have to be made thin like the upper end UET2 of the upper portion 80B3. However, in the case where thinning of the upper end UET1 of the main body section 80A is also requested, the upper end UET1 of the main body section 80A may have a thickness smaller than the basic thickness like the upper end UET2 of the upper portion 80B3.

The description has been made so far on the present invention on the basis of the specific embodiments. However, the present invention is not limited to the above specific embodiments. Modifications and improvements that do not depart from the technical idea are also included in the technical scope of the invention, and this is apparent for persons skilled in the art from the description of the claims.

REFERENCE SIGNS LIST

10 Lamp unit
20 Light source
30 Heat sink
30a Base section
30b Heat radiation fin
30c Attachment section
31. Screw tightening hole
31a Screw
32 Positioning pin
40 Reflector
50 Lens
50a. Light emission surface
50b Incident surface
51 Flange section
52 Lens holder
53 Lens fixing section
53a Peripheral edge section
53b Holding piece
54 Attachment section
54a Screw hole
54b Positioning hole
60 Movable shade section
61 Bracket
61a Flange section
61b Lead-out section
62 Positioning hole
63 Screw hole
64 Support shaft
70 Power-transmitting section
71 Bearing section
72 First arm
73 Second arm
74 Engagement section
74a First engagement section
74b Second engagement section
80 Movable shade
80A Main body section.
80B Auxiliary section
80B 1 Lower portion
80B2 Intermediate portion
80B3 Upper portion
80B3a Central portion
80B3b Lateral portion
81 Engagement section
81a. Engagement hole
82 Arm section
85 Torsion coil spring
90 Shaft section
93 Power section
94 Moving shaft
94a Engagement groove
101L, 101R Vehicle headlamp
102 Vehicle
A Range
D1 Distance
D2 Diameter
L1 Reference line
L2 Line
O Pivot point
P Center point
θ Angle
UET1 Upper end
UET2 Upper end

The invention claimed is:

1. A vehicle lamp comprising:
a light source; and
a movable shade section, wherein
the movable shade section includes:
a movable shade that rotates in a front-back direction and is switchable between a first position where light from the light source is not blocked and a second position where some of the light is blocked;
a power section having a moving shaft that moves in a horizontal direction to cause the rotation of the movable shade; and
a power-transmitting section that is interposed between the movable shade and the power section and transmits a moving force of the moving shaft as a rotary force of the movable shade,
the moving shaft has, on an outer circumference thereof, an engagement groove with which the power-transmitting section is engaged, the power-transmitting section includes:
a bearing section that is provided in an intermediate portion thereof and is supported to be rotatable in the horizontal direction orthogonal to the front-back direction;
a first arm that extends from the bearing section toward the movable shade side and is engaged with the movable shade; and
a second arm that extends from the bearing section toward the moving shaft side and has an engagement section slidably engaged with the engagement groove,
the engagement section includes:
a first engagement section that is engaged with the engagement groove and extends in the front-back direction; and
a second engagement section that has a substantially linear shape, is engaged with the engagement groove and is connected to and bent with respect to the first engagement section,
in a side view in which the movable shade section is viewed from a side, when a straight line that connects a rotation fulcrum at the time when the power-transmitting section rotates in the front-back direction and a center point of a cross section of the moving shaft is set as a reference line, an angle on the rotation fulcrum side, which is formed by the reference line and a portion of the second engagement section on an opposite side to the first engagement section relative to an intersection point where the second engagement section and the reference line intersect with each other, is set to equal to or larger than 80 degrees and equal to or smaller than 110 degrees,
the movable shade section includes a bracket provided with the movable shade, the power section, and the power-transmitting section,
the bracket includes a support shaft that extends along the front-back direction and rotatably supports the bearing section,
when the bearing section supported by the support shaft is viewed in a side view in which the movable shade section is viewed from the side, the rotation fulcrum is located at a substantially center position of the bearing section,
the movable shade is attached to an upper portion of the bracket via a shaft section that supports the movable shade to be rotatable in the front-back direction,
the power section is attached to a front side surface of the bracket,
the support shaft extends to the back along the front-back direction from a back side surface of the bracket,
the bracket has a lead-out section that leads out the engagement section of the second arm of the power-transmitting section such that the engagement section is positioned on a front side, and
the lead-out section is formed not to hinder motion of the second arm associated with movement of the moving shaft of the power section.

2. The vehicle lamp according to claim 1, wherein the second engagement section has such a length that the second engagement section is not disengaged from the engagement groove at the time of sliding along the engagement groove in association with the rotation of the power-transmitting section in the front-back direction.

3. The vehicle lamp according to claim 1, wherein the engagement groove has a width that is equal to or larger than 1.1 times and equal to or smaller than 1.5 times a diameter of a cross section of the power-transmitting section.

4. The vehicle lamp according to claim 1, wherein the power-transmitting section is formed of a wire, and the bearing section is a portion of the wire that is bent in a loop shape.

5. The vehicle lamp according to claim 1, wherein the first engagement section extends in parallel to the support shaft.

6. A vehicle lamp comprising a light source, and a movable shade section, wherein
the movable shade section includes a movable shade that rotates in a front-back direction about a rotation center shaft and is switchable between a first position where light from the light source is not blocked and a second position where the movable shade has a lifted posture from the first position and some of the light is blocked,
the movable shade includes:
a main body section that has an upper end shaped to form a cutoff line; and
an auxiliary section that is connected to a lower portion of the main body section in a vertical direction, and
when the movable shade is positioned at the second position, at least a portion of the auxiliary section that is lower than the rotation center shaft in the vertical direction is bent toward the main body section side so as to be positioned on the main body section side.

7. The vehicle lamp according to claim 6, wherein when viewed in a state where the movable shade is positioned at the second position, the auxiliary section includes:
a lower portion which is located on a back side of the main body section and at least a part of which is positioned closer to the main body section side than the rotation center shaft;
an intermediate portion that is bent from the lower portion and extends through a position above the rotation center shaft in the vertical direction so as to more separate from the main body section than the rotation center shaft; and
an upper portion that is bent from the intermediate portion and extends upward in the vertical direction, and
the upper portion has an upper end shaped to be form a cutoff line.

8. The vehicle lamp according to claim 7, wherein the lower portion is in substantially tight contact with the main body section.

9. The vehicle lamp according to claim 7, wherein a portion of the upper end of the upper portion where the cutoff line is formed is set to have a thickness smaller than a thickness of a portion of the upper portion on the intermediate portion side.

10. The vehicle lamp according to claim 6, wherein the movable shade section includes a bracket to which the movable shade is attached,
the movable shade is attached to an upper portion of the bracket via a shaft section that serves as the rotation center shaft for supporting the movable shade in the front-back direction, and
the movable shade includes:
a front-side rotation restricting section that abuts a front side surface of the bracket to restrict the rotation of the movable shade to the front at the time when the movable shade rotates to the front and that causes the movable shade to position at the second position; and a rear-side rotation restricting section that abuts a back side surface of the bracket to restrict the rotation of the movable shade to the back at the time when the movable shade rotates to the back.

11. The vehicle lamp according to claim 10, wherein the movable shade section includes:

a power section that is attached to the bracket and has a moving shaft that moves in a horizontal direction to cause the rotation of the movable shade; and a power-transmitting section that is attached to the bracket to be rotatable in the horizontal direction, is interposed between the movable shade and the moving shaft, and transmits a moving force of the moving shaft as a rotary force of the movable shade.

* * * * *